United States Patent Office 3,055,856
Patented Sept. 25, 1962

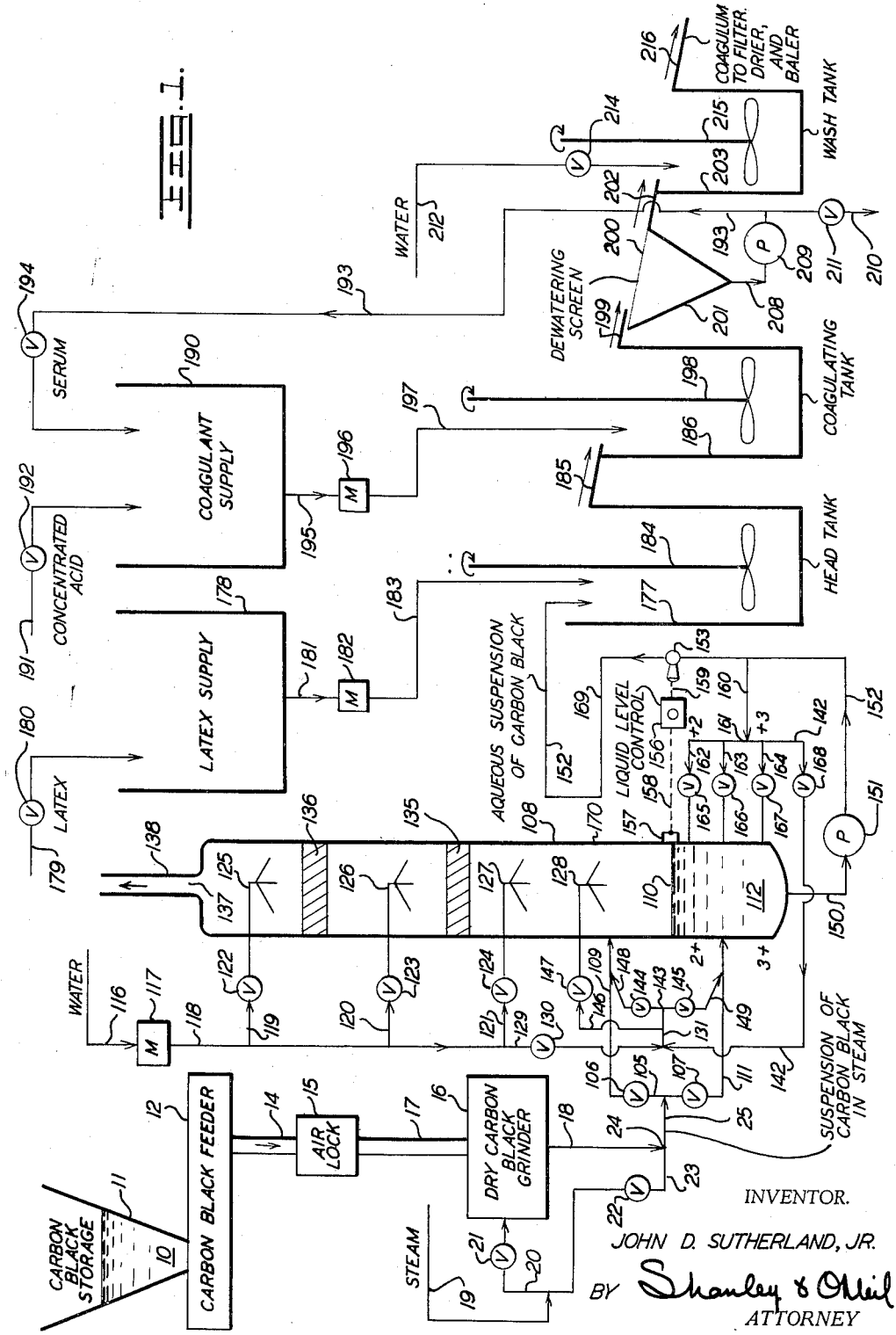

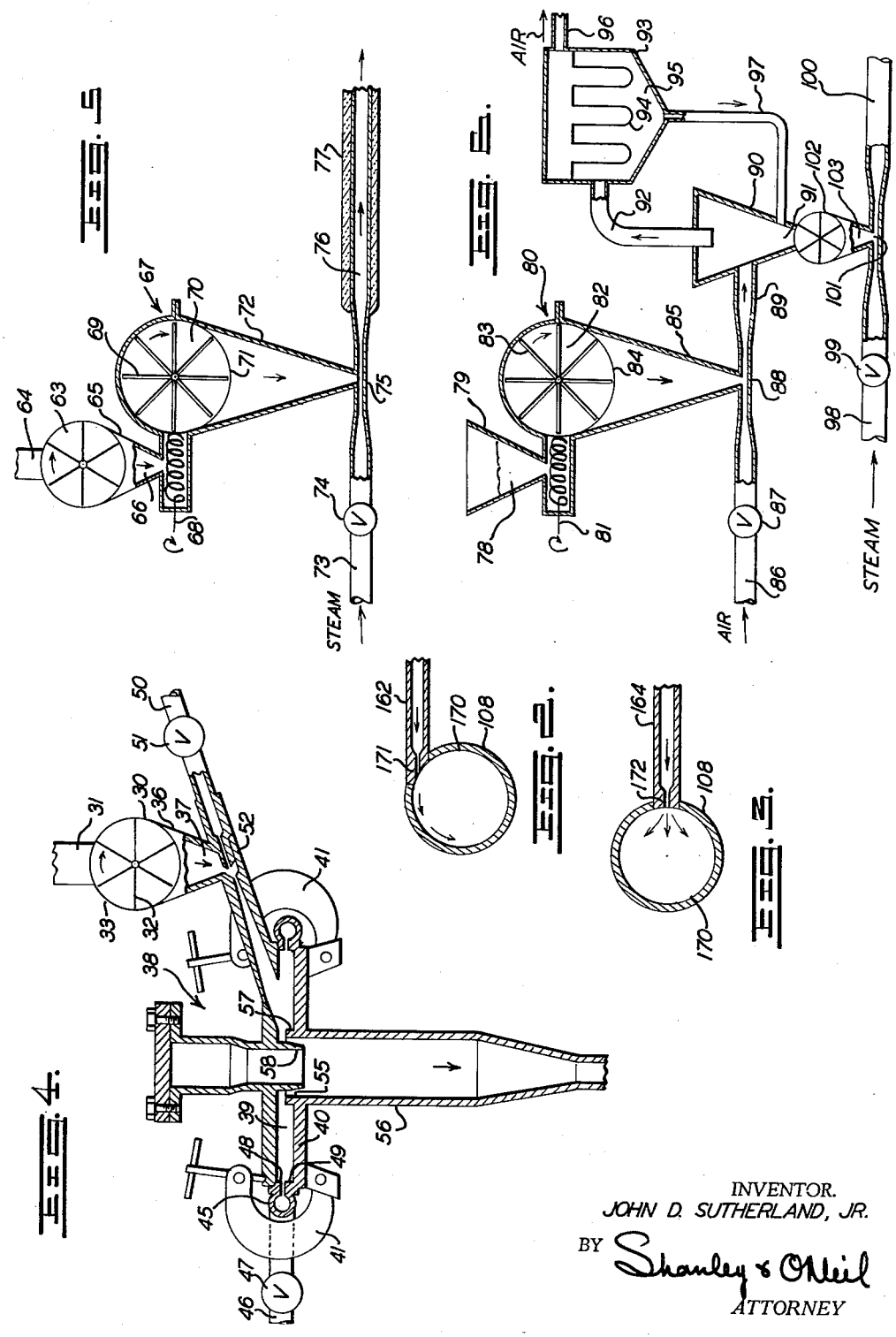

3,055,856
AQUEOUS SUSPENSION OF CARBON BLACK, APPARATUS AND METHOD FOR PREPARING SAME, METHOD FOR MIXING SAME WITH RUBBER, AND PRODUCT OBTAINED THEREBY
John D. Sutherland, Jr., Baton Rouge, La., assignor to Copolymer Rubber & Chemical Corporation, a corporation of Louisiana
Filed Dec. 30, 1958, Ser. No. 783,773
30 Claims. (Cl. 260—41.5)

This invention broadly relates to a novel method of preparing aqueous suspensions of carbon black and dispersions of carbon black in rubbery polymers. In some of its more specific aspects, the present invention further relates to improved apparatus for practicing the method of the invention and novel products prepared in accordance with the method of the invention.

It has long been known that incorporation of colloidal carbons generally referred to in the art as carbon black with rubbery polymers imparts desirable properties in the ultimate product such as increased modulus, tensile strength and abrasion resistance. While carbon black is widely used as a reinforcing agent for rubbery polymers and is very satisfactory for this purpose once properly incorporated therewith, the prior art methods available heretofore for incorporating carbon black with rubbery polymers have left much to be desired.

The method most widely used at present for incorporating carbon black with rubbery polymers involves vigorous milling of dry pelletized carbon black into a solid rubbery polymer to be reinforced therewith over an extended period of time. The labor and power requirements for milling dry pelletized carbon black into solid rubbery polymers are excessive and also it is often difficult to obtain a uniform dispersion of sufficiently finely divided particles of carbon black. This tends to deleteriously affect the ultimate product since, for best results, it is essential that the carbon black be uniformly dispersed in finely divided form throughout the solid rubbery polymer. In addition, the working conditions are very undesirable since the light, dry particles of carbon black are extremely difficult to restrict to the working area and invariably the milling equipment and even the entire plant in the vicinity of the milling operation are soon covered with a sooty film of carbon black.

As a result of the above-mentioned and other disadvantages of the prior art methods of milling dry carbon black into solid rubbery polymers, still other methods have been proposed for incorporating carbon black in rubbery polymers. One such method includes mixing an aqueous suspension of carbon black with rubbery polymers which are in the form of latex, and then coagulating the mixture of latex and aqueous suspension of carbon black to produce a solid rubbery polymer having carbon black dispersed in finely divided form throughout the particles of coagulum. However, this method, i.e., black masterbatching or oil-black masterbatching, requires that the carbon black be added to the latex in the form of an aqueous slurry with the carbon black in the slurry being in an extremely finely divided condition. Since the aqueous slurry of wetted carbon black is easily handled and readily restricted to the working area and, upon coagulation of the mixture, the resulting coagulum already contains the finely divided carbon black dispersed therein, the carbon black handling problem and extensive milling requirement characteristic of methods for incorporating dry pelletized carbon black with solid rubbery polymer are eliminated.

Carbon black is commercially available in the form of pellets which are loose agglomerates of very small particles of carbon. This form of carbon black is commonly referred to in the art as pelletized carbon black. The loose agglomerates of carbon or "pellets" must be ground to a much more finely divided state, wetted and suspended in an aqueous medium prior to mixing with latex. This operation of comminuting the pelletized carbon black, wetting and suspending the carbon black in an aqueous medium has long been a serious problem in the preparation of carbon black masterbatches. However, since it is essential that the carbon black be added to the latex in the form of an aqueous suspension containing carbon black in extremely finely divided particles, the industry has continued to practice the presently available unsatisfactory methods while awaiting the discovery of a more satisfactory method which eliminates the disadvantages of the prior art.

In accordance with current practice, aqueous suspensions of carbon black, i.e., carbon black slurries, are prepared by either dry grinding or wet grinding methods. In the dry grinding method, pelletized carbon black is first ground with a Mikro-Pulverizer or a similar apparatus and the resulting comminuted carbon black dropped in the dry state into a large vat of water containing a dispersing and stabilizing agent such as Marasperse CB. The dispersing and stabilizing agent is essential since otherwise the dry carbon black would not be wetted in a practical period of time. With the addition of surface active agents, the carbon black slurry prepared by the dry grinding method is relatively stable and may be stored for considerable periods of time. For example, the carbon black slurry is prepared batchwise in very large quantity and stored in slurry tanks awaiting use. A determination of the solids content is made and then the slurry is metered into latex at a rate sufficient to give a desired carbon black content in the resultant solid rubbery polymer upon coagulation. This method has two major disadvantages insofar as quality of the product goes. One disadvantage is that the presence of the dispersing agent has a harmful effect on the bond between the carbon black and the resultant solid rubbery polymer. This interferes with the degree of reinforcement imparted to the rubber by the carbon black and results in lower tensile strength, poor abrasion resistance and a slower curing rate, among other things. Also, since it is necessary for practical reasons to prepare the slurry batchwise in large quantities and then store this slurry awaiting use, storage in the presence of water harms the carbon black in some manner and it is not as effective as a reinforcing agent. In addition, during storage the particles of carbon black have a tendency to settle out. Thus, the concentration of carbon black is constantly changing and the actual concentration at any given time may differ appreciably from the last determination of solids content. In view of this, it is almost impossible to obtain the exact desired quantity of carbon black in the rubber and it is extremely difficult to produce a uniform product.

The disadvantages of the prior art dry grinding process have resulted in considerable experimentation with wet grinding processes wherein the pelletized carbon black is mixed with water and then ground in the presence of water to thereby produce a slurry. In some instances, the surface active agent which is necessary in the dry grinding process above described may be omitted or the quantity reduced somewhat. In accordance with one wet grinding method, an experimental mechanical disperser is provided in the form of a pipe having a series of high-speed rotating knives arranged along the axis. A water-pelletized carbon black mixture is fed to the disperser with the high-speed rotating knives being depended upon to grind the pelletized carbon black and form a slurry without the use of dispersing and stabilizing agents. However, this process is not satisfactory since the power requirement necessary to give a suitable particle size is extremely high. In addition, the experimental unit cannot be scaled up to a size which is satisfactory for commercial operation and up until now the process remains a laboratory curiosity. For example, not more than one pound of carbon black per minute may be ground and the power requirement is 15 horsepower. In addition to the above-described apparatus, wet Mikro-Pulverizers or Charlotte colloid mills have been used heretofore for grinding carbon black in the wet state, but these units require frequent expensive repairs in addition to being inefficient in operation. As a result of the disadvantages of the wet and dry grinding methods heretofore available to the industry, those skilled in the art have long sought a satisfactory method for grinding pelletized carbon black to a very finely divided particle size and then suspending the same in an aqueous medium.

The present invention overcomes the disadvantages of both the dry and wet grinding processes above described. For example, in accordance with the present invention, it is possible to continuously prepare an aqueous suspension of finely divided carbon black in an efficient manner without the need for a dispersing agent. Thus, the detrimental effects of the dispersing agent as well as its cost, the necessity for storing large quantities of carbon black slurry, and the disadvantages of the constantly changing solids content characteristic of the prior art dry grinding process are eliminated. Also, in accordance with the present invention, the carbon black may be continuously comminuted in a dry grinding operation, wetted and an aqueous suspension prepared at the rate it is being fed to a black masterbatching step. Since the dry pelletized carbon black may be readily metered, a constant carefully controlled amount of carbon black in the form of a slurry may be provided in this manner continuously. In addition, the present invention eliminates the extremely high power requirement, low output per unit and high upkeep cost characteristic of the wet grinding process above mentioned. For example, in accordance with the present invention, as little as one-half horsepower per minute per pound of comminuted carbon black output is required and a fluid energy pulverizer or mechanical pulverizer of the hammer mill type may be used. This equipment is extremely sturdy, requires very little upkeep, and is capable of high output per unit. Thus, the present invention is a major advance in the art of preparing aqueous suspensions of carbon black and the preparation of black or oil-black masterbatches therefrom.

In accordance with one important embodiment of the present invention, pelletized carbon black is ground to the desired particle size in the dry state and suspended in a gaseous medium including steam. Then, the gaseous suspension of comminuted carbon black is intimately contacted with an aqueous medium to condense the steam and produce an aqueous suspension of carbon black. The quenching of steam contained in the gaseous suspension of carbon black is preferably done under conditions whereby the loss of carbon black to the surroundings is substantially eliminated. Thus, the environment may be maintained in a clean condition thereby assuring greatly improved working conditions in the vicinity of the operation and much lower cleaning costs. The grinding and wetting of the comminuted carbon black by the method of the invention is more uniform and much faster than any satisfactory method available heretofore and, even more important, dispersing and stabilizing agents may be eliminated. In addition, it is possible to prepare continuously an aqueous suspension of comminuted carbon black at a predetermined constant rate and solids content, and then continuously supply the carbon black in the form of an aqueous suspension at a constant rate to a subsequent black or oil-black masterbatching operation. Thus, the present invention is capable of producing a greatly improved product since the dispersing and stabilizing agent is omitted, the carbon black need not be retained in contact with the aqueous medium for other than minimum periods of time, the carbon black may be in extremely finely divided particles due to the dry grinding operation being more efficient in this respect and the immediate use of the suspension, and the absolute solids content of the suspension and the finished product may be controlled within closer limits than heretofore possible by any commercial method without the necessity for constantly determining solids content. Many other features and advantages of the invention are present and will be apparent to those skilled in the art.

It is an object of the present invention to provide a novel method of preparing aqueous suspensions of carbon black.

It is a further object of the present invention to provide a novel method of preparing rubbery polymers containing dispersed carbon black.

It is still a further object of the present invention to provide novel aqueous dispersions of carbon black and solid rubbery polymers containing dispersed carbon black.

It is still a further object of the present invention to provide improved apparatus useful in practicing the method of the invention.

It is still a further object of the present invention to provide a novel method of wetting carbon black which does not require the use of a dispersing and stabilizing agent wherein the loss of carbon black to the surroundings may be substantially reduced or eliminated.

It is still a further object of the present invention to provide a novel continuous method of preparing black masterbatches or oil-black masterbatches.

Still other objects of the present invention and the attendant advantages thereof will be apparent to those skilled in the art upon reference to the following detailed description, the example, and the drawings, wherein:

FIGURE 1 is a presently preferred arrangement of apparatus for preparing an aqueous suspension of carbon black and a black masterbatch therefrom in accordance with the present invention;

FIGURE 2 is a diagrammatic cross-sectional view taken through the quenching tower along the line 2—2 of FIGURE 1;

FIGURE 3 is a diagrammatic cross-sectional view taken through the quenching tower along the line 3—3 of FIGURE 1;

FIGURE 4 is a diagrammatic cross-sectional view of a fluid energy pulverizer suitable for dry grinding pelletized carbon black in accordance with the present invention;

FIGURE 5 is a diagrammatic cross-sectional view of a mechanical pulverizer suitable for grinding dry pelletized carbon black in accordance with the present invention and illustrating a method of suspending the resulting comminuted carbon black in steam upon passing from the mechanical pulverizer; and FIGURE 6 is a diagrammatic cross-sectional view taken through a mechanical pulverizer suitable for grinding dry pelletized carbon black in accordance with the present invention and illustrating a method of suspending the comminuted carbon black first in air for the purpose of conveying the same in the dry state over a desired distance, followed by separation of a large proportion of the air with a cyclone separator and bag-type dust collector and subsequent suspension of the dry comminuted carbon black in steam prior to wetting.

Referring now to FIGURE 1 of the drawings, dry pelletized carbon black 10 in storage bin 11 may be metered and fed at a constant predetermined controlled rate by means of carbon black feeder 12 via chute 14 to air lock 15. The carbon black feeder 12 may be a continuous loss in weight type feeder such as an "Omega feeder" or any suitable gravimetric feeder designed to deliver a constant carefully controlled output of carbon black. The air lock 15 may be a roto-lock valve or a star feeder, and is designed to prevent the direct pulling of air into the carbon black grinder to be described hereinafter, although air present in the light, dry, voluminous pellets of carbon black may be present in the feed. While it is not usually preferred practice, air lock 15 may be eliminated in most instances and the carbon black passed directly to the carbon black grinder.

The metered dry pelletized carbon black may be continuously passed at a predetermined controlled rate to dry carbon black grinder 16 via chute 17 where the loosely agglomerated particles of carbon are ground to a desired finely comminuted form. The grinder 16 may be of any suitable prior art design and construction, as will be explained more fully hereinafter. However, grinders of the type commonly referred to in the art as fluid energy pulverizers or mechanical pulverizers for dry pelletized carbon black are generally satisfactory and may be used. The carbon black may be suspended in steam during the dry grinding operation, or the resulting comminuted carbon black may be withdrawn from grinder 16 via conduit 18 and then suspended in steam. For example, steam may be fed to grinder 16 via conduit 19 and conduit 20 including open control valve 21, with control valve 22 in conduit 23 being closed, and the carbon black suspended in steam during the grinding operation; or the dry comminuted carbon black may be withdrawn from grinder 16 via conduit 18 and then suspended in steam supplied via conduits 19 and 23 including open control valve 22, with control valve 21 in conduit 20 being closed. The point where the conduits 18 and 23 join may be constructed in the form of a venturi passage 24 to insure continuous removal of comminuted carbon black from carbon black grinder 16 via conduit 18 and suspension of comminuted carbon black in steam. A suspension of comminuted carbon black in a gaseous medium including steam continuously flows through conduit 25 at substantially the rate the pelletized carbon black is being ground in grinder 16, which in turn is dependent upon the predetermined controlled rate at which the dry pelletized carbon black is fed to grinder 16.

Referring now to FIGURE 4 of the drawings, which illustrates a dry carbon black grinder in the form of a fluid energy pulverizer wherein steam under pressure is used for injection of the pelletized carbon black and also as the fluid providing energy for the grinding operation, metered dry pelletized carbon black from a feeder such as carbon black feeder 12 is passed to roto-lock valve 30 via chute 31. The roto-lock valve 30 is a prior art type of air lock readily available and includes rotating segments 32 in sealing engagement with cylinder 33. As the segments 32 rotate in the direction of the arrow, the segment on top communicating with chute 31 is filled with carbon black while the segments on the sides are in sealing engagement with cylinder 32 thereby preventing the direct pulling in of air through roto-lock valve 30. When the filled segment reaches the bottom, the carbon black contents are poured into feed funnel 36 thereby forming a body of pelletized carbon black at 37.

The fluid energy pulverizer generally designated as 38 may be the type described under "Jet Pulverizers" in Perry's Chemical Engineering Handbook, the type disclosed in U.S. Patent 2,590,220, or other suitable prior art types suitable for grinding pelletized carbon black or other loosely agglomerated particles of carbon.

The pulverizer 38 includes a chamber 39 formed by a pair of spaced circular plates 40 which are clamped together by clamping means 41. High pressure steam is fed to a header 45 via conduit 46 at a rate controlled by valve 47 and then into chamber 39 through tangential jets or orifices 48 formed in wall 49. Pelletized carbon black 37 in feed funnel 36 is fed into chamber 39 by means of steam under pressure which is flowing through conduit 50 at a rate controlled by valve 51. The conduit 50 is provided with a venturi passage 52 which assures proper withdrawal of carbon black 37 from feed funnel 36 and its suspension in steam. An outlet 55 is provided in the vicinity of the center of chamber 39 which leads into conduit 56. A dam 57 is provided on the bottom of chamber 39 immediately adjacent the outlet 55 and with a hollow annular member 58 of a diameter somewhat smaller than the conduit 56 being inserted thereinto thereby reducing the cross-sectional area providing for communication between conduit 56 and chamber 39.

The steam fed through conduits 46 and 50 may be at any suitable pressure such as about 20–200 p.s.i.g., but in most instances preferably about 50 p.s.i.g. in conduit 46 and 125 p.s.i.g. in conduit 50. Obviously, there is a pressure drop in chamber 39, which may be approximately 5–15 p.s.i.g. or higher in some instances. The pelletized carbon black 37 may be fed into the fluid energy pulverizer 38 at a feed rate of about 1–80 pounds per minute, but preferably about 30 pounds per minute in most instances. Also, it is desired to have a ratio by weight between the feed rates of steam and carbon black of approximately 0.5:1 and 12:1, but usually preferably about 1:1, depending somewhat upon the rate of pelletized carbon black feed and the desired particle size in the comminuted carbon black. It is essential that the steam not be allowed to condense while within the fluid energy pulverizer 38 and apparatus associated therewith to a sufficient extent to cause the carbon black to become moist and ball up or otherwise plug the apparatus. Condensation of steam may be readily prevented by supplying superheated steam at about 250–900° F., but preferably about 450° F. in most instances. However, since it is only essential to prevent condensation of sufficient steam within the apparatus to cause plugging due to wetting of the carbon black, it may be possible in some instances to use saturated steam. It also may be possible to provide heating means for the apparatus to prevent condensation of steam or to remove water entering with saturated steam.

High pressure steam is injected into fluid energy pulverizer 38 to grind the pelletized carbon black by centrifugal action in the circular chamber 38. At the same time, the carbon black is suspended in steam to thereby obtain its remarkable wetting properties during the subsequent quenching step. As pointed out above, when the comminuted carbon black is suspended in steam or a gaseous medium including steam at the time of introduction into the aqueous medium, the need for a wetting agent is eliminated. Thus, in operating the fluid energy pulverizer 38, dry pelletized carbon black 37 is withdrawn from feed funnel 36 by means of steam passing through venturi passage 52 in conduit 50 and the resulting steam suspension passed into chamber 39 at high velocity. Then, the high pressure steam fed into chamber 39 via tangential steam jets 48 impart an extremely rapid, swirling motion to the carbon black pellets. As a result of the collision of the carbon black particles with one another and the surfaces of the chamber 39, the carbon black pellets are ground to as fine a particle size as may be desired. The finely ground material overflows dam 57 and escapes through outlet 55 into conduit 56 in the form of a gaseous suspension of comminuted carbon black. The preferred particle size in the comminuted carbon black will carry depending upon the nature of the desired reinforced rubbery polymer product, but preferably not more than about 2% of the comminuted carbon particles should be retained on a 325 mesh screen. However, much smaller particle sizes may be present and are preferred since the smaller the particle size, the better the results.

The pelletized carbon black feed may be of a type commonly employed in the rubber industry and the pellets are usually of such a size as will pass a 12 mesh screen. However, the term "pelletized carbon black" is broadly used in the specification and claims and intended to include carbon black which is termed pelletized in this industry, as well as other loosely agglomerated particles of carbon black regardless of their prior processing.

Referring now to FIGURE 5, metered dry pelletized carbon black from a carbon black feeder such as 12 illustrated in FIGURE 1 is passed to roto-lock valve 63 via chute 64 and deposited in feed funnel 65 as shown at 66. The roto-lock valve 63 is not essential since the screw feeder 68 may be designed and constructed so as to also perform the function of an air lock. However, when present as illustrated in FIGURE 5, the roto-lock valve 63 may be similar in construction and operation to the roto-lock valve 30 described above in connection with FIGURE 4. The carbon black is continuously fed to mechanical pulverizer 67 by means of screw feeder 68. The mechanical pulverizer 67 is provided with a plurality of rapidly rotating hammers 69 which are driven in the direction of the arrows. The carbon black fed to chamber 70 is ground by rapidly rotating hammers 69 to a particle size sufficiently small to pass through classifying screen 71. The classifying screen 71 is selected so as to assure a sufficiently small particle size in the resulting comminuted carbon black. After passing through classifying screen 71, the comminuted carbon black falls into funnel 72. High pressure steam is fed via conduit 73 at a rate controlled by valve 74 to venturi passage 75 for the purpose of withdrawing comminuted carbon black from funnel 72 and suspending the same in steam. Since a small amount of air is usually present in the carbon black feed passing through roto-lock valve 63, the gaseous suspension of carbon black will contain a major proportion of steam and a minor proportion of air. In this manner, a constant flow of comminuted carbon black suspended in a gaseous medium including steam flows through conduit 76 to a quenching step to be described hereinafter. The steam feed through conduit 73 may be superheated to a temperature of 250–900° F. However, saturated steam may be used in instances where there is insufficient condensation or moisture to cause plugging of the equipment with moist carbon black or where steps are taken to prevent condensation such as by heating all steam carrying equipment to an elevated temperautre substantially above the boiling point of water. Also, insulation 77 may be provided to reduce loss of heat and the amount of condensation.

Referring now to FIGURE 6 of the drawings, metered dry pelletized carbon black at 78 may be fed to feed funnel 79 by a carbon black feeder such as 12 illustrated in FIGURE 1. The carbon black at 78 is then fed to mechanical pulverizer 80 by means of screw feeder 81. The mechanical pulverizer 80 is provided with a chamber 82 housing hammers 83 which are rapidly driven in the direction of the arrow. The mechanical pulverizer 80 may operate in the manner described in connection with that of FIGURE 5, i.e., the carbon black is pulverized by mechanical action of hammers 83 to a desired particle size and passed through classifying screen 84 into funnel 85. The comminuted carbon black is then suspended in air supplied via conduit 86 at a rate controlled by valve 87. To facilitate withdrawal of comminuted carbon black from funnel 85 and its suspension in air, the conduit 86 is provided with venturi passage 88. The suspension of comminuted carbon black in air flowing in conduit 89 may be transferred over long distances without danger of wetting due to condensation of the gaseous suspending medium. The gaseous suspension then may be passed to a cyclone separator 90 where most of the comminuted carbon black separates at 91 and air containing some suspended carbon black is withdrawn via conduit 92 and passed to bag type dust collector 93. The remaining suspended carbon black is filtered from the air by bag-like filter members 94 with the carbon black being removed therefrom and collected at 95 and air free of carbon black being withdrawn from dust collector 93 via conduit 96. For the purpose of increasing the rate of flow through dust collector 93, a substantial difference between the pressures on the entrance and exit sides of filter members 94 may be maintained. This may be accomplished by maintaining a superatmospheric pressure in conduit 92 and substantially atmospheric pressure in conduit 96, or by maintaining substantially atmospheric pressure in conduit 92 and a subatmospheric pressure in conduit 96. The carbon black at 95 is withdrawn via conduit 97 and passed to cyclone separator 90 where it is mixed with carbon black collecting at 91. The carbon black at 91 is withdrawn from cyclone separator 90, passed through air lock 102 to funnel 103, and suspended in steam supplied via conduit 98 at a rate controlled by valve 99 to provide a suspension of comminuted carbon black in steam flowing in conduit 100. To facilitate withdrawal of carbon black and its suspension in steam, a venturi passage 101 may be provided. The gaseous suspension of carbon black in steam flowing in conduit 100, the suspension usually containing some air that was withdrawn from cyclone separator 90 along with the carbon black, is then passed to a quenching step for the preparation of an aqueous suspension of carbon black.

The suspension of comminuted carbon black in a gaseous medium including steam, whether prepared by the methods of FIGURES 4, 5 or 6, is subsequently passed to a quenching step where the comminuted carbon black is wetted and an aqueous suspension thereof prepared by condensing the steam with an aqueous medium. Referring again to FIGURE 1, the gaseous suspension of carbon black flowing in conduit 25 is passed to header 105 and, depending upon the positions of control valves 106 and 107, it may be passed into quenching tower 108 via conduit 109 at a point above liquid level 110, or it may be passed via conduit 111 and introduced at a point below the liquid level 110 to also obtain vigorous agitation of the collected body 112 of aqueous suspension of carbon black in addition to quenching of the steam. If desired, the control valves 106 and 107 each may be cracked and a first portion of the gaseous suspension of carbon black passed via conduit 109 and a second portion passed via conduit 111. This latter procedure will allow partial quenching of the gaseous suspension in aqueous suspension of carbon black 112 with accompanying agitation and heating thereof and partial condensation in the space above liquid level 110 by intimate contact with sprayed aqueous medium as will be explained more fully hereinafter.

The gaseous suspension of carbon black introduced above liquid level 110 via conduit 109, as well as any gaseous suspension introduced via conduit 111 and escaping upward through aqueous suspension 112, is quenched in the gaseous phase above liquid level 110 by means of sprayed aqueous medium. The aqueous medium may be introduced via conduit 116 and, after careful metering by meter 117, passed at a predetermined controlled rate via header 118 and conduits 119, 120 and 121 including control valves 122, 123 and 124, respectively, to spray devices 125, 126 and 127, respectively. The spray devices 125, 126 and 127, as well as spray device 128 to be described more fully hereinafter, may be prior art spray devices of a type designed to produce a spray of finely divided aqueous medium, preferably in relatively finely divided form, which falls downwardly through quenching tower 108. For example, the spray devices may be of a type comprising a nozzle provided with a plurality of small openings through which aqueous medium under pressure is projected and subdivided into droplets, or they may be of the type which includes a rapidly rotating member to which aqueous medium is supplied and thrown outwardly by centrifugal force to thereby subdivide the aqueous medium into droplets. The header 118 is also in communication with conduit 129 including control valve 130 for the purpose of supplying fresh aqueous medium to conduit 131, as will be described more fully hereinafter.

As previously described, usually some gases that are not condensable upon contact with aqueous medium are present in the gaseous suspension of carbon black fed to quenching tower 108. These noncondensable gases, whether air or other non-condensable gases, are almost impossible to eliminate entirely. If the gaseous suspension of carbon black in steam flowing in conduit 25 contains a substantial proportion of air and it is introduced via conduit 111 beneath the liquid level 110, then the gases which are not condensed in the aqueous suspension of carbon black 112 tend to rise upwardly therein and form a froth on the surface which is very undesirable. Thus, in instances where a large amount of air is present, it is preferred that the gaseous suspension of carbon black be fed via conduit 109, introduced at a point above liquid level 110 and then quenched in the gaseous phase by means of sprayed aqueous medium. This procedure allows the noncondensable gases to escape upwardly through tower 108 without at any time being entrapped within a body of aqueous medium and yet the steam content of the gaseous suspension is readily condensed. Often small amounts of air or other noncondensable gases may be dissolved in the aqueous medium and, where their original content is very low, it is sometimes possible to completely dissolve the noncondensable gases in a body of the aqueous medium and the difficulty due to froth formation is avoided. Any air or other noncondensable gases passing upwardly through quenching tower 108 tend to carry some comminuted carbon black and for this reason a series of vertically arranged sprays is provided. Although the amount of carbon black lost from this source may be very small on a daily basis, nevertheless it is very undesirable since the surrounding area eventually is covered with a layer of carbon black. Thus, while the economic loss of the carbon black itself is unimportant, the resulting unpleasant working conditions and the upkeep necessary over the entire plant area are prohibitive. In accordance with the present invention it is possible to substantially eliminate the loss of carbon black from quenching tower 108 by providing a plurality of vertically arranged spray devices 125, 126, 127 and 128 and demisters 135 and 136 which assure intimate contact between the upwardly rising uncondensed gases and the aqueous medium. The spray devices 125 and 126 are positioned above demisters 136 and 135, respectively, for the purpose of supplying aqueous medium to wet the demisters and wash carbon black therefrom downwardly through quenching tower 108. By the time the noncondensable gases reach outlet 137, they are washed substantially free of carbon black and are then passed to the atmosphere via outlet conduit 138.

In accordance with one important embodiment of the present invention, it has been discovered that when comminuted carbon black is suspended in a gaseous medium including steam and the steam content quenched with an aqueous medium, then the steam has a very remarkable wetting property which results in the comminuted carbon black being wetted immediately and suspended in the aqueous medium without the necessity for a wetting agent. While the gaseous suspension may be quenched by direct injection into a body of the aqueous medium, it is usually preferred that the condensation be by means of sprayed aqueous medium falling through the gaseous suspension. However, if desired, other methods of quenching may be used. For example, aqueous medium in the form of fresh water and/or dilute latex supplied via conduits 116, 118 and 129, or aqueous suspension of carbon black supplied via conduit 142, or mixtures thereof in any proportions, may be fed via conduit 131 to header 143 including control valves 144 and 145. Also, the aqueous medium flowing in conduit 131 may be fed via conduit 146 to spray device 128 upon opening control valve 147 and closing control valves 144 and 145. Upon opening control valve 144 and closing control valves 145 and 147, the aqueous medium flowing in conduit 131 may be passed via conduit 148 and injected or sprayed directly into the gaseous suspension of carbon black flowing in conduit 109 to condense or partially condense the steam content before discharging the remainder into quenching tower 108 at a point above liquid level 110. In such event, especially when gasliquid contact means are provided within quenching tower 108 in the vicinity of the point of entry of conduit 109 and below, the air or other noncondensable gases entrapped in the aqueous medium will have a chance to pass upwardly in quenching tower 108. Similarly, upon closing control valves 144 and 146, the aqueous medium flowing in conduit 131 may be passed via conduit 149 and injected or sprayed directly into the gaseous suspension of carbon black flowing in conduit 111 to thereby condense or partially condense the steam content before it is passed to quenching tower 108.

The aqueous suspension of carbon black 112 collecting in the bottom of quenching tower 108 is withdrawn via conduit 150 and forced by means of pump 151 through conduit 152 including liquid level control valve 153. The liquid level control valve 153 is operated by liquid level controller 156 which is operatively connected in a conventional manner with level sensitive means 157 and liquid level control valve 153 by means of connections 158 and 159, respectively. The liquid level controller 156 operates valve 153 in response to changes in the height of liquid level 110 to thereby maintain the same within predetermined limits by by-passing a portion of the aqueous suspension of carbon black withdrawn via conduit 150 via conduit 160 to header 161. Header 161 is in communication with conduits 162, 163, 164 and 142 which include control valves 165, 166, 167, and 168, respectively, and lead back to quenching tower 108. Inasmuch as the liquid level 110 is maintained within predetermined limits by the above means, it will be apparent that the volume of liquid flowing in conduit 152 at point 169 will be at the rate the aqueous medium and water resulting from condensation of the steam are supplied to tower 108 and this volume of aqueous medium will contain suspended comminuted carbon black in an amount equal to the rate of feed to grinder 16. Also, the weight of carbon black flowing through conduit 152 at point 169 at any given time, in continuous operation, will be equal to the rate of feed of carbon black by carbon black feeder 12. Thus, a convenient means is provided for continuously supplying a given quantity of comminuted carbon black in the form of an aqueous suspension which does not contain a dispersing or stabilizing agent and wherein the carbon black content may be controlled within very narrow limits. Preferably, a 1–10% by weight carbon black slurry is prepared in quenching tower 108 by feeding thereto via conduit 118 20–200 gallons per minute of aqueous medium when the steam suspension of carbon black feed is within the limits mentioned hereinbefore. For best results in most applications, it is preferred that a 6% slurry be prepared. The temperature of the collecting slurry may be maintained at 130–210° F., for example, or any suitable temperature but preferably at 185° F. The pressure in the quench tank may be about 10 inches of mercury vacuum to 2 p.s.i.g., but preferably about 1 p.s.i.g.

The capacity of pump 151 may be such as to provide for the pumping of aqueous suspension of carbon black at a rate substantially higher than that flowing in conduit 152 at point 169, thereby assuring recycle at a substantial rate via conduit 160. In this manner, it is possible to provide a feed of aqueous suspension of carbon black in conduits 162, 163 and 164 for injection into the body of aqueous suspension 112 for purposes of agitation and/or in conduit 142 for the purpose of quenching the gaseous suspension of carbon black. Recycling carbon black suspension via conduit 142 assures that sufficient aqueous medium will always be present for quenching the steam with the necessity for fresh water or latex being held to a minimum. This arrangement allows the concentration of the aqueous suspension to be increased to any desired practical level. Conduits 162, 163 and 164 may be constructed so as to assure a maximum amount of agitation within aqueous suspension 112 and prevent carbon black from settling out. Also, since aqueous suspensions of carbon black tend to be thixotropic, this arrangement allows the highest possible concentration of carbon black to be reached for a given fluidity. With reference to FIGURE 2 of the drawings, the conduit 162 is shown passing tangentially through wall 170 of quenching tower 108 and in such a manner as to impart a swirling motion to the body of aqueous suspension 112. Also, the conduit 162 may contain a restricted portion 171 to further increase this effect. Similarly, upon reference to FIGURE 3 of the drawings, the conduit 164 is shown passing perpendicularly through wall 170 of quenching tower 108 and in such a manner as to insure agitation of the body of aqueous suspension 112 but not necessarily with a swirling motion. The conduit 164 may be provided with a restricted portion 172 which further increases this agitation effect. It will be apparent that any or all of the conduits 162, 163, and 164 may pass through wall 170 of quenching tower 108 tangentially as described in FIGURE 2 or perpendicularly as described in FIGURE 3.

The aqueous suspension of carbon black flowing in conduit 152 is passed to head tank 177. Rubbery polymer latex is fed to latex supply tank 178 via conduit 179 at a rate controlled by valve 180 and withdrawn therefrom via conduit 181 and passed, at a predetermined rate controlled by meter 182, via conduit 183 to head tank 177. The latex and aqueous suspension of carbon black are thoroughly mixed in head tank 177 by agitation means including driven stirrer 184. Preferably, the latex and aqueous suspension of carbon black are fed continuously to head tank 177 and overflow therefrom via spout 185 into coagulation tank 186. When the feed rate of carbon black in the form of a 1–10%, by weight aqueous slurry is as above described, then, for example, 5–40% TSC latex may be fed to the head tank at the rate of 1–100 gallons per minute, but preferably 20% TSC latex is fed at the rate of about 35 gallons per minute. Fresh concentrated acid or other suitable coagulant is fed to coagulant supply tank 190 via conduit 191 at a rate controlled by valve 192 and mixed with serum flowing into coagulant supply tank 190 via conduit 193 at a rate controlled by valve 194. The relative flow rates of serum and concentrated acid are controlled so as to provide a coagulant of desired strength in coagulant supply tank 190. When the coagulant is an aqueous solution of acid, dilute acid is withdrawn from coagulant supply tank 190 via conduit 195 and, after metering by meter 196, it is passed via conduit 197 to coagulation tank 186. The coagulant and homogeneous latex-carbon black mixture or carbex in coagulation tank 186 are thoroughly mixed and continuously agitated by agitation means including driven stirrer 198. The resulting coagulum overflows spout 199 onto dewatering screen 200 where the serum passes through the dewatering screen into vessel 201, while the black masterbatch crumb passes across dewatering screen 200 and spout 202 into wash tank 203. The serum is withdrawn from member 201 via conduit 208 and pumped by means of pump 209 via conduit 193 to coagulant supply tank 190. Any excess serum not required for coagulant make-up may be removed via conduit 210 at a rate controlled by valve 211 and discharged. The black masterbatch crumb passed to wash tank 203 is thoroughly washed with water supplied thereto via conduit 212 at a rate controlled by valve 214. Agitation means including driven stirrer 215 may be used for the purpose of insuring thorough washing of the crumb. After washing, the black masterbatch crumb overflows wash tank 203 via spout 216 and is passed to a conventional dewatering step, drier and baler, or given other desired prior art treatments.

The latex fed to latex supply tank 178 may be either natural rubber or synthetic rubber latex. When the latex is synthetic rubber latex, it may be, for example, any suitable latex prepared by prior art processes wherein a polymerizable monomeric material or a mixture of polymerizable materials is emulsified in an aqueous medium by means of an emulsifying agent such as a soap or other suitable surface active agent, and the polymerization made to take place at a suitable controlled temperature in the presence of a catalyst and/or other regulating materials. The primary emulsifier preferably should be unstable at low pH and may be a long chain fatty acid soap such as sodium or potassium oleate or stearate, the rosin soaps, or mixtures thereof. The polymerization is generally "short stopped" at a desired stage before complete conversion, such as at about 60% conversion, and the unreacted monomer or monomers removed by conventional flashing and/or stripping before feeding to the head tank. As is well understood in the art, it is also advantageous in the preparation of certain synthetic rubber lattices, such as SBR lattices, to carry out the polymerization at low temperature such as about 41° F. However, the polymerization may take place at a high temperature such as about 122° F. when preparing SBR lattices by a prior art "hot rubber" process.

Examples of polymerizable materials useful in preparing synthetic rubber lattices are the various 1,3-butadienes such as 1,3-butadiene, methyl-2-butadiene-1,3, piperylene, and 2,3-dimethyl-butadiene-1,3. If desired, the polymerizable material may be a mixture of a 1,3-butadiene, such as 1,3-butadiene itself with another polymerizable compound which is capable of forming rubbery copolymers with the 1,3-butadienes. For example, such polymerizable mixtures may contain up to 50% (or higher in some instances) of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with the 1,3-butadienes are aryl olefins, such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene, methyl vinyl ether; and methyl vinyl ketone. The foregoing polymerizable substances or mixtures are examples of materials that may be used in the preparation of rubbery polymer latices and solid rubbery polymers which along with natural rubber and polychloroprene, may be referred to herein as homopolymers of conjugated diolefins and copolymers of conjugated diolefins and ethylenically unsaturated monomers. The preferred rubbery polymer or latex is prepared from a polymerizable material which is a mixture of butadiene and styrene wherein the styrene content of the mixture, by weight, is less than about 50%. However, any suitable butadiene-styrene synthetic rubber or latex may be used in practicing the present invention.

A typical recipe in parts by weight for preparing a butadiene-styrene synthetic rubber latex by a "cold rubber" process is given below in Table I.

TABLE I

| | |
|---|---|
| Butadiene | 100–50. |
| Styrene | 0–50. |
| Primary emulsifier [1] | 1.5–5.0. |
| Electrolyte [2] | 0.2–1.5. |
| Secondary emulsifier [3] | 0–0.12. |
| Ethylenediamine tetraacetic acid tetra sodium salt [4] | 0–0.10 (in soap solution). |
| Sodium hydrosulfite | 0–0.10. |
| Water | 150–250. |
| Sodium formaldehyde sulfoxylate | 0.04–0.20. |
| Diisopropylbenzene hydroperoxide or paramenthane hydroperoxide | 0.03–0.30. |
| Tertiarydodecylmercaptan | 0–0.3. |
| Ferrous sulfate heptahydrate | 0.02–0.04. |
| Versene 100 to complex ferrous sulfate | 0.03–0.06. |
| Shortstop [5] | 0.05–0.20. |

[1] The primary emulsifier may be a long chain fatty acid soap such as sodium or potassium oleate or stearate, the rosin soaps, or mixtures thereof.
[2] The following electrolytes or mixtures may be used: Potassium chloride, sodium chloride, trisodium phosphate, tripotassium phosphate, potassium pyrophosphate, potassium sulfate, sodium sulfate, sodium borate and lithium chloride. The preferred electrolyte is 0.3 part by weight of trisodium phosphate.
[3] Tamol N, Daxad 11, Nycol (polymerized sodium salts of alkyl naphthalene sulfonic acid).
[4] Sold as Versene 100, a product of Dow Chemical Company; Sequestrene 30A, a product of Alrose Chemical Company; Nullapon BF–13, a product of Antara Chemicals.
[5] A 50/50 mixture of sodium dimethyl dithio carbamate and sodium poly sulfide.

Any suitable prior art coagulant may be fed to coagulation tank 186 from coagulant supply tank 190. Examples of coagulants include alum and other suitable salts or acids such as sulfuric acid, hydrochloric acid, phosphoric acid, acetic acid, etc. The preferred coagulant is a dilute sulfuric acid solution having a pH of about 1.0–2.5 and, preferably, about 1.7. The acid is added in sufficient quantity to maintain a suitable pH such as about 1.5–5.0, but preferably about 3.0. Thus, the serum overflowing spout 199 contains a considerable amount of free acid and the serum is recycled via conduit 193 to coagulant supply tank 190 where additional concentrated sulfuric acid is mixed therewith to provide the desired pH. The temperature of the coagulation mixture may vary somewhat, but usually a temperature of about 110–210° F. is satisfactory. While a continuous process has been disclosed and described herein, it is understood that the present invention is also capable of batch operation.

The following specific example further illustrates the present invention.

Example

Dry pelletized high abrasion furnace black was metered and fed to a fluid energy pulverizer such as illustrated in FIGURE 4 at a rate of 30 pounds per minute. Superheated steam at 440° F. was passed to the fluid energy pulverizer for the purpose of supplying the fluid energy necessary for feeding and grinding the carbon black. The steam used in the injector jet feeding the carbon black into the fluid energy pulverizer was at a pressure of 125 p.s.i.g., while the steam tangentially supplied to the chamber was at a pressure of 50 p.s.i.g. The feed ratio by weight of steam to carbon black was about 1:1.

The resultant steam-comminuted carbon black suspension withdrawn from the fluid energy pulverizer was fed to a quench tower of the type illustrated in FIGURE 1. In the quench tower, the suspension of comminuted carbon black in steam was converted into a 6% carbon black slurry (by weight) by means of spray nozzles feeding about 56 gallons per minute of water. The temperature of the resultant carbon black slurry was about 185° F. The pressure in the quench tower was from about 10 inches of mercury vacuum to 2 p.s.i.g., but preferably about 1 p.s.i.g. The carbon black slurry collecting in the bottom of the quench tower was withdrawn at the rate of its formation by means of a pump and transferred to the head tank where it was mixed with 34.5 gallons per minute of 20% TSC (by weight) SBR latex prepared by a conventional "cold rubber" process using the recipe of Table I. By controlling the continuous feed of carbon black to the fluid energy pulverizer, it was possible to continuously withdraw carbon black slurry from the quenching tower having a constant carbon black content. Then, by carefully controlling the latex feed rate, it was possible to provide a carbex overflowing from the head tank of almost constant proportions of rubbery polymer to carbon black. This carbex was coagulated by addition of serum which had been acidified with concentrated sulfuric acid to provide a pH of 1.7. The serum was added to the coagulation tank with agitation in sufficient quantity to maintain a pH therein of about 3.0. The resulting coagulum was allowed to continuously overflow from the coagulation tank onto a dewatering screen where the serum was removed for recycle to the coagulant supply, and the crumb was passed to a wash tank. After thorough washing in the wash tank with agitation, the black masterbatch crumb was passed to a conventional filter, drier and baler.

The black masterbatch product was tested and found to contain extremely finely divided particles of carbon black uniformly distributed therethrough. The above-prepared product was compared with products of similar composition but prepared by conventional processes and found to have improved properties such as a uniform, fast cure rate, improved abrasion resistance and increased tensile strength. Also, the carbon black content of the black masterbatch of the invention varied only slightly from run to run. The process was also found to offer many advantages not possible heretofore. For example, after many months of operation, the area surrounding the carbon black grinding and quenching operation was extremely clean as compared with conventional operation. Thus, the normally high expense of upkeep surrounding such units was eliminated. Also, in changing the carbon black-rubber polymer ratio, it was only necessary to change the feed rate of carbon black to the process while maintaining the latex feed rate constant. However, it would also be possible to maintain the carbon black feed rate constant and change the latex feed rate in order to achieve desired changes in the masterbatch composition. In addition, it was possible to continuously produce a black masterbatch of uniform composition without the necessity for constantly determining the solids content of the carbon black slurry.

What is claimed is:

1. A method of preparing an aqueous suspension of carbon black comprising the steps of comminuting pelletized carbon black by grinding in the dry state, suspending the comminuted carbon black in a gaseous medium comprising steam, and intimately contacting the gaseous suspension of comminuted carbon black with an aqueous medium to condense steam and produce a suspension of carbon black in the aqueous medium.

2. The aqueous suspension of carbon black prepared by the method of claim 1.

3. A method of preparing an aqueous suspension of carbon black comprising the steps of comminuting pelletized carbon black by grinding in the dry state, suspending the comminuted carbon block in a gaseous medium comprising steam, and contacting the gaseous suspension of comminuted carbon black with sprayed aqueous medium to condense steam and produce a suspension of carbon black in the aqueous medium.

4. A method of preparing an aqueous suspension of carbon black comprising the steps of comminuting pelletized carbon black by grinding in the dry state, suspending carbon black in a gaseous medium comprising steam, intimately contacting in a treating zone the gaseous suspension of comminuted carbon black with an aqueous medium to condense steam and produce an aqueous suspension of carbon black, the gaseous suspension of carbon black containing gas remaining in the gaseous phase after contact with the aqueous medium withdrawing the aqueous suspension of carbon black from a lower portion of the treating zone, and withdrawing from an upper portion of the treating zone gas remaining in the gaseous phase after contacting the gaseous suspension with the aqueous medium.

5. The aqueous suspension of carbon black prepared by the method of claim 4.

6. A method of preparing an aqueous suspension of carbon black comprising the steps of comminuting pelletized carbon black by grinding in the dry state, suspending carbon black in a gaseous medium comprising steam, intimately contacting in a treating zone the gaseous suspension of comminuted carbon black with sprayed aqueous medium to condense steam and produce an aqueous suspension of carbon black, the gaseous suspension of carbon black containing gas remaining in the gaseous phase after contact with the aqueous medium withdrawing the resulting aqueous suspension of carbon black from a lower portion of the treating zone, and withdrawing from an upper portion of the treating zone gas remaining in the gaseous phase after contacting the gaseous suspension with the aqueous medium.

7. A method of preparing an aqueous suspension of carbon black comprising the steps of comminuting pelletized carbon black by grinding in the dry state, suspending carbon black in a gaseous medium comprising steam, passing the gaseous suspension of carbon black into a treating zone, intimately contacting the gaseous suspension in the treating zone with sprayed water to condense steam and produce an aqueous suspension of carbon black, the gaseous suspension of carbon black containing gas remaining in the gaseous phase after contact with the water, withdrawing the resulting aqueous suspension of carbon black from a lower portion of the treating zone, and withdrawing from an upper portion of the treating zone gas remaining in the gaseous phase after contacting the gaseous suspension with water, the gas prior to withdrawal from the treating zone being contacted with water until it is substantially free of carbon black.

8. A method of preparing an aqueous suspension of carbon black comprising the steps of comminuting pelletized carbon black by grinding in the dry state, suspending carbon black in a gaseous medium including steam, passing the gaseous suspension of carbon black into a treating zone, intimately contacting in the treating zone the gaseous suspension with sprayed water to condense steam and produce an aqueous suspension of carbon black, the gaseous suspension of carbon black containing gas remaining in the gaseous phase after contact with the water, collecting a body of the aqueous suspension of carbon black in a lower portion of the treating zone, agitating the collected body of aqueous carbon black suspension, withdrawing from an upper portion of the treating zone gas remaining in the gaseous phase after contacting the gaseous suspension with water, the gas prior to withdrawal from the treating zone being contacted with water until it is substantially free of carbon black.

9. A method of preparing an aqueous suspension of carbon black comprising the steps of comminuting pelletized carbon black by grinding in the dry state, suspending the comminuted carbon black in steam, and intimately contacting the steam suspension of comminuted carbon black with an aqueous medium to condense steam and produce a suspension of carbon black in the aqueous medium.

10. A method of preparing an aqueous suspension of carbon black comprising the steps of comminuting pelletized carbon black by grinding in the dry state, suspending the comminuted carbon black in steam, and intimately contacting the steam suspension of comminuted carbon black with sprayed aqueous medium to condense steam and produce a suspension of carbon black in the aqueous medium.

11. A method of preparing an aqueous suspension of carbon black comprising the steps of comminuting pelletized carbon black by grinding in the dry state, suspending carbon black in steam, intimately contacting in a treating zone the steam suspension of comminuted carbon black with an aqueous medium to condense steam and produce an aqueous suspension of carbon black, the steam suspension of carbon black containing gas remaining in the gaseous phase after contact with the aqueous medium, withdrawing the aqueous suspension of carbon black from a lower portion of the treating zone and withdrawing from an upper portion of the treating zone gas remaining in the gaseous phase after contacting the steam suspension with the aqueous medium.

12. A method of preparing an aqueous suspension of carbon black comprising the steps of comminuting pelletized carbon black by grinding in the dry state, suspending carbon black in steam, intimately contacting in a treating zone the steam suspension of comminuted carbon black with sprayed aqueous medium to condense steam and produce an aqueous suspension of carbon black, the steam suspension of carbon black containing gas remaining in the gaseous phase after contact with the aqueous medium, withdrawing the resulting aqueous suspension of carbon black from a lower portion of the treating zone, and withdrawing from an upper portion of the treating zone gas remaining in the gaseous phase after contacting the steam suspension with the aqueous medium.

13. A method of preparing an aqueous suspension of carbon black comprising the steps of comminuting pelletized carbon black by grinding in the dry state, suspending carbon black in steam, passing the steam suspension of carbon black into a treating zone, intimately contacting the steam suspension of carbon black in the treating zone with sprayed water to condense steam and produce an aqueous suspension of carbon black, the steam suspension of carbon black containing gas remaining in the gaseous phase after contact with the water, withdrawing the resulting aqueous suspension of carbon black from a lower portion of the treating zone, withdrawing from an upper portion of the treating zone gas remaining in the gaseous phase after contacting the steam suspension with water, the gas prior to withdrawal from the treating zone being contacted with water until it is substantially free of carbon black.

14. A method of preparing an aqueous suspension of carbon black comprising the steps of comminuting pelletized carbon black by grinding in the dry state, the carbon black being suspended in steam while it is being comminuted, passing the resulting steam suspension of comminuted carbon black into a treating zone, intimately contacting in the treating zone the steam suspension of carbon black with sprayed water to condense steam and produce an aqueous suspension of carbon black, the steam suspension of carbon black containing gas remaining in the gaseous phase after contact with the water, collecting a body of the aqueous suspension of carbon black in a lower portion of the treating zone, agitating the collected body of aqueous carbon black suspension, withdrawing from an upper portion of the treating zone gas remaining in the gaseous phase after contacting the gaseous suspension with water, the gas prior to withdrawal from the treating zone being contacted with water until it is substantially free of carbon black.

15. A method of preparing a dispersion of carbon black in rubbery polymer comprising the steps of comminuting pelletized carbon black by grinding in the dry state, suspending comminuted carbon black in a gaseous medium including steam, intimately contacting the gaseous suspension of comminuted carbon black with aqueous medium to condense steam and produce a suspension of carbon black in the aqueous medium, mixing the resulting aqueous suspension of carbon black with a rubbery polymer in the form of latex, the rubbery polymer being selected from the group consisting of natural rubber, polychloroprene, homo-polymers of conjugated diolefins, copolymers of conjugated diolefins and mono-ethylenically unsaturated monomers, and mixtures thereof, and coagulating the resulting mixture by adding a coagulating agent thereto.

16. The dispersion of carbon black in rubbery polymer prepared by the method of claim 15.

17. The method of claim 15 wherein the rubbery polymer is a copolymer of butadiene and styrene.

18. The dispersion of carbon black in the copolymer of butadiene and styrene prepared by the method of claim 17.

19. A method of preparing a dispersion of carbon black in rubbery polymer comprising the steps of comminuting pelletized carbon black by grinding in the dry state, suspending carbon black in a gaseous medium including steam, intimately contacting in a treating zone the gaseous suspension of comminuted carbon black with an aqueous medium to condense steam and produce an aqueous suspension of carbon black, the gaseous suspension of carbon black containing gas remaining in the gaseous phase after contact with the aqueous medium withdrawing the aqueous suspension of carbon black from a lower portion of the treating zone, withdrawing from an upper portion of the treating zone gas remaining in the gaseous phase after contacting the gaseous suspension with the aqueous medium, mixing the withdrawn aqueous dispersion of carbon black with rubbery polymer in the form of latex, the rubbery polymer being selected from the group consisting of natural rubber, polychloroprene, homo-polymers of conjugated diolefins, copolymers of conjugated diolefins and mono-ethylenically unsaturated monomers, and mixtures thereof, and coagulating the resulting mixture by adding a coagulating agent thereto.

20. The dispersion of carbon black in rubbery polymer prepared by the method of claim 17.

21. A method of preparing a dispersion of carbon black in rubbery polymer comprising the steps of comminuting pelletized carbon black by grinding in the dry state, suspending carbon black in a gaseous medium including steam, passing the gaseous suspension of carbon black into a treating zone, intimately contacting the gaseous suspension in the treating zone with sprayed water to condense steam and produce an aqueous suspension of carbon black, the gaseous suspension of carbon black containing gas remaining in the gaseous phase after contact with the water, withdrawing an aqueous suspension of carbon black from a lower portion of the treating zone, withdrawing from an upper portion of the treating zone gas remaining in the gaseous phase after contacting the gaseous suspension with water, the gas prior to withdrawal from the treating zone being contacted with water until substantially free of carbon black, mixing the withdrawn aqueous suspension of carbon black with a rubbery polymer in the form of latex, the rubbery polymer being selected from the group consisting of natural rubber, polychloroprene, homo-polymers of conjugated diolefins, copolymers of conjugated diolefins and mono-ethylenically unsaturated monomers, and mixtures thereof, and coagulating the resultant mixture by adding a coagulating agent thereto.

22. A method of preparing a dispersion of carbon black in rubbery polymer comprising the steps of continuously comminuting pelletized carbon black at a controlled predetermined rate by grinding in the dry state, suspending the carbon black in a gaseous medium including steam, intimately contacting the gaseous suspension of comminuted carbon black with an aqueous medium to condense steam and produce a suspension of carbon black in the aqueous medium, the gaseous suspension of carbon black being continuously contacted with the aqueous medium and at the rate the carbon black is being comminuted, continuously mixing the resultant aqueous suspension of carbon black with a controlled predetermined amount of rubbery polymer in the form of latex, the rubbery polymer being selected from the group consisting of natural rubber, polychloroprene, homo-polymers of conjugated diolefins, copolymers of conjugated diolefins and mono-ethylenically unsaturated monomers, and mixtures thereof, and continuously coagulating the resultant mixture by continuously adding a coagulating agent thereto.

23. A method of preparing a dispersion of carbon black in rubbery polymer comprising the steps of continuously comminuting pelletized carbon black at a controlled predetermined rate by grinding in the dry state, suspending carbon black in a gaseous medium including steam, continuously passing the steam suspension of carbon black into a treating zone, intimately contacting the steam suspension of carbon black in the treating zone with an aqueous medium to condense steam and produce an aqueous suspension of carbon black, the steam suspension of carbon black being continuously contacted with the aqueous medium and at the rate the carbon black is being comminuted, withdrawing the aqueous suspension of carbon black at the rate it is being formed, mixing the withdrawn aqueous suspension of carbon black with a controlled predetermined amount of rubbery polymer in the form of latex, the rubbery polymer being selected from the group consisting of natural rubber, polychloroprene, homo-polymers of conjugated diolefins, copolymers of conjugated diolefins and mono-ethylenically unsaturated monomers, and mixtures thereof, and continuously coagulating the resultant mixture by addition of a coagulating agent thereto.

24. A method of preparing a dispersion of carbon black in rubbery polymer comprising the steps of continuously comminuting pelletized carbon black at a controlled predetermined rate by grinding in the dry state, suspending the carbon black in a gaseous medium including steam, continuously passing the gaseous suspension of carbon black into a treating zone at the rate it is being comminuted, continuously intimately contacting the gaseous suspension of comminuted carbon black while in the treating zone with an aqueous medium to condense steam and produce a suspension of carbon black in the aqueous medium, the gaseous suspension of carbon black containing gas remaining in the gaseous phase after contact with the aqueous medium collecting a body of the aqueous suspension of carbon black in a lower portion of the treating zone, agitating the collected body of aqueous carbon black suspension, withdrawing from an upper portion of the treating zone gas remaining in the gaseous phase after contacting the gaseous suspension of carbon black with aqueous medium, the gas prior to withdrawal from the treating zone being contacted with aqueous medium until it is substantially free of carbon black, continuously mixing the withdrawn aqueous dispersion of carbon black with a predetermined controlled amount of rubbery polymer in the form of latex, the rubbery polymer being selected from the group consisting of natural rubber, polychloroprene, homo-polymers of conjugated diolefins, copolymers of conjugated diolefins and monoethylenically unsaturated monomers, and mixtures thereof, and continuously coagulating the resultant mixture by continuous addition of a coagulating agent thereto.

25. A method of preparing a dispersion of carbon black in rubbery polymer comprising the steps of continuously comminuting pelletized carbon black at a predetermined controlled rate by grinding in the dry state, suspending carbon black in steam, continuously passing the steam suspension of carbon black into a treating zone, the carbon black being passed into the treating zone at the rate it is being comminuted, continuously intimately contacting the steam suspension of comminuted carbon black with sprayed water to condense steam and produce an aqueous suspension of carbon black, the gaseous suspension of carbon black containing gas remaining in the gaseous phase after contact with the water, collecting a body of the aqueous suspension of carbon black in a lower portion of the treating zone, agitating the collected body of aqueous carbon black suspension, withdrawing from an upper portion of the treating zone gas remaining in the gaseous phase after contacting the steam suspension of carbon black with water, the gas prior to withdrawal from the treating zone being contacted with water until it is substantially free of carbon black, continuously withdrawing an aqueous suspension of carbon black from the collected body, mixing the withdrawn aqueous suspension of carbon black with a predetermined controlled amount of rubbery polymer in the form of latex, the rubbery polymer being selected from the group consisting of natural rubber, polychloroprene, homo-polymers of conjugated diolefins, copolymers of conjugated diolefins and mono-ethylenically unsaturated monomers, and mixtures thereof, and continuously coagulating the resultant mixture by continuous addition of a coagulating agent thereto.

26. The method of claim 25 wherein the rubbery polymer is a copolymer of butadiene and styrene.

27. Apparatus for preparing an aqueous suspension of carbon black comprising means for grinding dry pelletized carbon black, means for suspending carbon black in a gaseous medium including steam, means for contacting a gaseous suspension of carbon black with an aqueous medium to produce an aqueous suspension of carbon black, the gaseous medium containing gas which remains in the gaseous phase after contact with the aqueous medium, means for passing the gaseous suspension of comminuted carbon black to the contacting means, the contacting means including means for collecting gas remaining in the gaseous phase after contacting the gaseous medium with the aqueous medium, means for withdrawing collected gas from the contacting means and means for withdrawing an aqueous suspension of carbon black from the contacting means.

28. Apparatus for preparing an aqueous suspension of carbon black comprising means for grinding dry pelletized carbon black, means for suspending carbon black in a gaseous medium including steam, tower means defining a treating zone, means for passing a gaseous suspension of the comminuted carbon black into the treating zone, means in the treating zone for contacting the gaseous suspension of carbon black with an aqueous medium to produce an aqueous suspension of carbon black and gas in the gaseous phase, the gaseous medium containing gas which remains in the gaseous phase after contact with the aqueous medium, means for contacting the gas to remove suspended carbon black, the tower means including means for collecting gas remaining in the gaseous phase after contacting the gaseous medium with the aqueous medium, means for withdrawing collected gas substantially free of carbon black from the tower means, and means for withdrawing an aqueous suspension of carbon black from the tower.

29. Apparatus for preparing an aqueous suspension of carbon black comprising means for grinding dry pelletized carbon black, means for suspending carbon black in a gaseous medium including steam, tower means for contacting the gaseous suspension of carbon black with an aqueous medium to produce an aqueous suspension of carbon black and gas in the gaseous phase, the gaseous medium containing gas remaining in the gaseous phase after contact with the aqueous medium, means for passing the gaseous suspension of comminuted carbon black into an intermediate portion of the tower, means for contacting the gaseous suspension of carbon black with an aqueous medium, means for contacting the gas to remove carbon black entrained therein, the tower including means for collecting gas remaining in the gaseous phase after contacting the gaseous medium with the aqueous medium, means for withdrawing collected gas substantially free of carbon black from an upper portion of the tower, means for maintaining a body of aqueous suspension of carbon black in a lower portion of the tower, means for agitating the collected body of aqueous suspension of carbon black, and means for withdrawing aqueous suspension of carbon black from the lower portion of the tower.

30. Apparatus for preparing an aqueous suspension of carbon black comprising means for grinding dry pelletized carbon black to produce comminuted carbon black, means for suspending the comminuted carbon black in a dry gaseous medium, means for separating the gaseous medium from the comminuted carbon black, means for passing the gaseous suspension of carbon black to the gaseous medium separating means, means for suspending the resultant separated carbon black in a gaseous medium including steam, means for contacting the gaseous suspension of carbon black in steam with an aqueous medium to produce an aqueous suspension of carbon black, means for passing the gaseous suspension of carbon black in steam to the contacting means, and means for withdrawing an aqueous suspension of carbon black from the contacting means.

References Cited in the file of this patent

UNITED STATES PATENTS

| 2,585,659 | Kilpatrick | Feb. 12, 1952 |
| 2,769,795 | Braendle | Nov. 6, 1956 |

OTHER REFERENCES

Rubber Age, October 1944, page 73.
"The Oil and Gas Journal," volume 5, No. 46, May 1953, page 160.